United States Patent
Liu et al.

(10) Patent No.: US 11,993,541 B2
(45) Date of Patent: May 28, 2024

(54) MULTITYPE-ADSORPTIVE-GROUP POLYCARBOXYLIC ACID WATER-REDUCING AGENT, METHOD FOR PREPARING THE SAME AND USE THEREOF

(71) Applicants: Sobute New Materials Co., Ltd., Jiangsu (CN); Nanjing Bote New Materials Co., Ltd., Jiangsu (CN)

(72) Inventors: Jiaping Liu, Jiangsu (CN); Han Yan, Jiangsu (CN); Yong Yang, Jiangsu (CN); Jinzhi Liu, Jiangsu (CN); Xin Shu, Jiangsu (CN); Xiumei Wang, Jiangsu (CN); Yanwei Wang, Jiangsu (CN); Cheng Yu, Jiangsu (CN); Qianping Ran, Jiangsu (CN)

(73) Assignees: SOBUTE NEW MATERIALS CO., LTD., Jiangsu (CN); NANJING BOTE NEW MATERIALS CO., LTD., Jiangsu (CN)

( * ) Notice: Subject to any disclaimer, the term of this patent is extended or adjusted under 35 U.S.C. 154(b) by 669 days.

(21) Appl. No.: 17/272,922

(22) PCT Filed: Apr. 18, 2019

(86) PCT No.: PCT/CN2019/083219
§ 371 (c)(1),
(2) Date: Mar. 2, 2021

(87) PCT Pub. No.: WO2020/140344
PCT Pub. Date: Jul. 9, 2020

(65) Prior Publication Data
US 2021/0198143 A1   Jul. 1, 2021

(30) Foreign Application Priority Data
Dec. 31, 2018 (CN) .................... 201811650978.7

(51) Int. Cl.
| C04B 24/16 | (2006.01) |
| C04B 24/26 | (2006.01) |
| C04B 28/04 | (2006.01) |
| C04B 103/30 | (2006.01) |
| C08F 290/06 | (2006.01) |

(52) U.S. Cl.
CPC ........ C04B 24/165 (2013.01); C04B 24/2658 (2013.01); C04B 24/2694 (2013.01); C04B 28/04 (2013.01); C08F 290/062 (2013.01); C04B 24/2647 (2013.01); C04B 2103/302 (2013.01)

(58) Field of Classification Search
CPC combination set(s) only.
See application file for complete search history.

(56) References Cited

U.S. PATENT DOCUMENTS

| 3,925,515 A | 12/1975 | Velker et al. |
| 4,207,405 A * | 6/1980 | Masler, III ................ C02F 1/56 |
| | | 524/415 |
| 4,459,386 A * | 7/1984 | Grundmann .............. C08F 8/40 |
| | | 525/329.2 |
| 2007/0039516 A1 | 2/2007 | Bandoh |
| 2012/0141609 A1 | 6/2012 | Topolkaraev et al. |

FOREIGN PATENT DOCUMENTS

| CN | 102070762 A | 5/2011 |
| CN | 103030334 A | 4/2013 |
| CN | 105712649 A | 6/2016 |
| CN | 105713151 A | 6/2016 |
| CN | 106832147 A | 6/2017 |
| CN | 106977129 A * | 7/2017 |
| CN | 107337765 A | 11/2017 |
| CN | 107793447 A | 3/2018 |
| CN | 107936209 A | 4/2018 |
| CN | 108276533 A | 7/2018 |
| CN | 108373524 A | 8/2018 |

(Continued)

OTHER PUBLICATIONS

Machine translation of CN 106832147 A, retrieved Nov. 2023 (Year: 2023).*
ISA China National Intellectual Property Administration, International Search Report Issued in Application No. PCT/CN2019/083219, Sep. 26, 2019, 5 pages.
Hu, L. et al., "Studies on Biologically Active Organophosphorus Compounds (XXI) Synthesis of (2-Substituted Benzamidoformyloxy) hydrocarbylphosphonate," Hecheng Huaxue, vol. 5, No. 3, 1997, 5 pages. (Submitted with English Abstract).
Peikun, Z. et al., "Synthesis and Performance of Cationic Flame-retardant Waterborne Polyurethane," China Leather, vol. 43, No. 21, Nov. 2014, 6 pages. (Submitted with English Abstract).

(Continued)

*Primary Examiner* — Nicole M. Buie-Hatcher
(74) *Attorney, Agent, or Firm* — McCoy Russell LLP

(57) ABSTRACT

The present invention discloses a multitype-adsorptive-group polycarboxylic acid water-reducing agent, consisting of 30-60 wt % of a macromolecule with multitype-adsorptive groups and water, the macromolecule with multitype-adsorptive groups has a polyethylene glycol side chain, and adsorption groups of the polymer backbone include a carboxylic acid group, a sulfonic acid group and a phosphoric acid group, the phosphoric acid group being linked to the backbone of the macromolecule with multitype-adsorptive groups by nucleophilic addition. The water-reducing agent of the present invention has significantly improved adaptability to different cements and aggregates while maintaining a high water reduction efficiency, compared with the conventional polycarboxylic acid water-reducing agent agent. It has a good water reducing efficiency in many different grades of cement, as well as a better resistance to aggregates containing more impurities such as machine-made sand.

10 Claims, 1 Drawing Sheet

(56) References Cited

FOREIGN PATENT DOCUMENTS

| FR | 2948932 B1 | 8/2012 | |
|---|---|---|---|
| WO | WO-03031365 A1 * | 4/2003 | ........... C04B 24/165 |
| WO | WO-2014193754 A1 * | 12/2014 | .............. C07F 9/091 |

OTHER PUBLICATIONS

Tang, Y. et al., "Development and Performance Research of New High-plastic-super-retarding Admixture," China Academic Journal Electronic Publishing House, vol. 29, No. 25, May 2015, 4 pages. (Submitted with English Abstract).
State Intellectual Property Office of the People's Republic of China, Office Action and Search Report Issued in Application No. 201811650978.7, Feb. 10, 2021, 9 pages. (Submitted with Partial Translation).

* cited by examiner

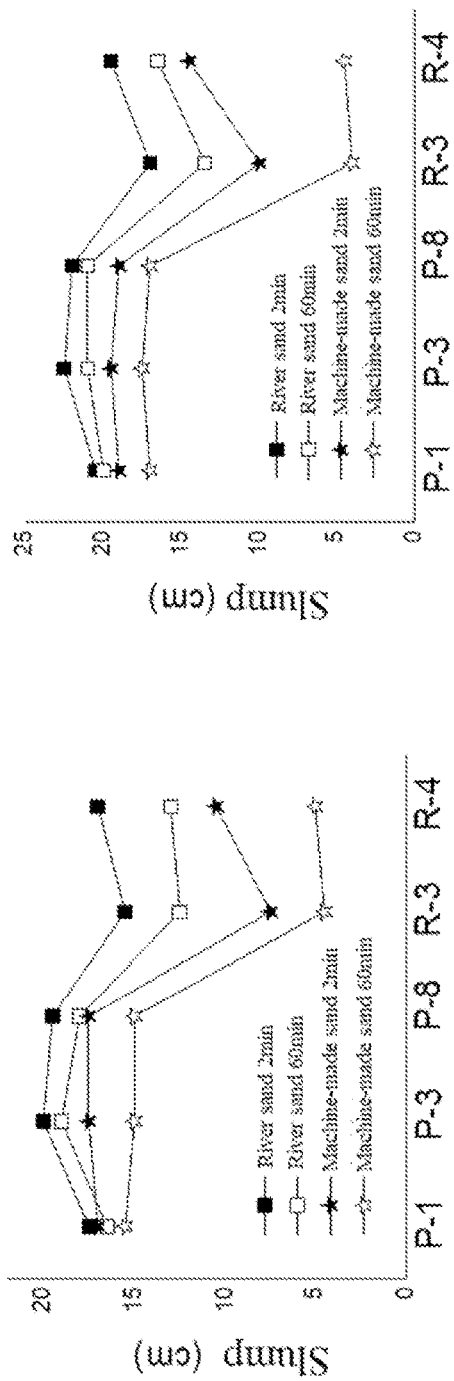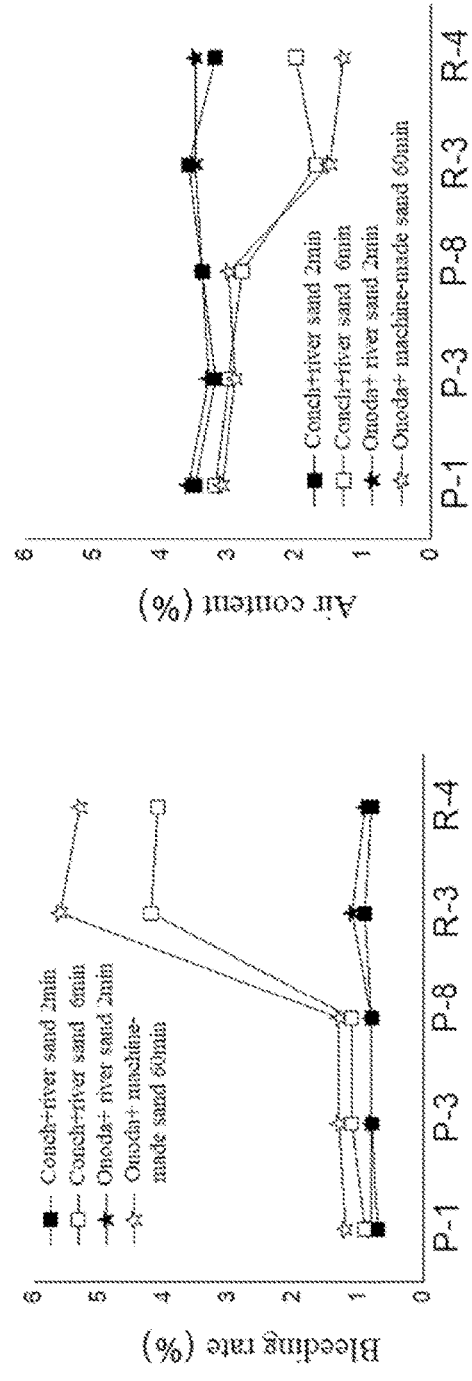
Fig. 1a
Fig. 1b
Fig. 1c
Fig. 1d

MULTITYPE-ADSORPTIVE-GROUP POLYCARBOXYLIC ACID WATER-REDUCING AGENT, METHOD FOR PREPARING THE SAME AND USE THEREOF

CROSS REFERENCE TO RELATED APPLICATIONS

This application is a U.S. National Phase of International Application No. PCT/CN2019/083219 entitled "MULTIPLE ADSORPTION POLYCARBOXYLIC ACID WATER-REDUCING AGENT, PREPARING METHOD THEREFOR AND USE THEREOF" and filed on Apr. 18, 2019, which claims priority to Chinese patent application No. 201811650978.7 filed on Dec. 31, 2018. The entire contents of each of the above-listed applications are hereby incorporated herein by reference for all purposes.

TECHNICAL FIELD

The present invention relates to a multitype-adsorptive-group polycarboxylic acid water-reducing agent, a method for preparing the same and use thereof, pertaining to the technical field of building materials.

BACKGROUND

In recent years, with the development trend towards large-scale construction projects, super high-rise and long-span construction projects are increasing. The requirements on performances of water-reducing agents, as an indispensable admixture for the preparation of high-performance concrete used in these projects, also increases. Polycarboxylic acid high-performance water-reducing agents, as one type of the most effective water-reducing agents, play an increasingly important role in large-scale projects. At present, the mainstream polycarboxylic acid water-reducing agent is still a comb-shaped polymer compound with (meth)acrylic acid as a backbone and polyethylene glycol as a side chain. However, the type and activity of the adsorption group of the backbone lack diversities, and its adaptability to different cement, sand and coarse aggregate materials needs to be improved. Because of the vast territory of China, the components and quality of building materials vary from place to place, which makes the application performance of polycarboxylic acid unstable due to the inadaptability of polycarboxylic acid with building materials. How to solve this problem is an important issue in the development and application of the polycarboxylic acid water-reducing agents.

In recent years, industry research and patent reports show that introducing a phosphonic (phosphoric) acid group into polycarboxylic acid is an effective way to solve the adaptability problem of polycarboxylic acid water-reducing agents. Patent CN107936209A reported a highly adaptable water-reducing agent based on condensation polymerization with an aromatic derivative formaldehyde condensate as its skeleton, and a method for preparing the same. However, there are relatively many side reactions in preparing the water-reducing agent by a condensation polymerization reaction, and there are high requirements on the control of reaction operation. Patent CN108276533A reported a highly adaptable water-reducing agent containing a phosphonic acid group and a method for preparing the same, but in this patent, the phosphonic acid group is indirectly connected with other structural units through an ester bond, which is easy to hydrolyze and fail in highly alkaline cement paste. Patent CN106832147B reported a preparation method of a polycarboxylic acid water-reducing agent containing a phosphonic acid group, which involves the preparation of phosphonic acid-based monomers using acyl chloride that is difficult to preserve, and produces a large amount of toxic and corrosive hydrogen chloride gas.

The preparation of phosphonic acid-based monomers in the above patent mostly involves complex reactions and processes that partially produce harmful three wastes.

SUMMARY

In view of the above, the present invention provides a multitype-adsorptive-group polycarboxylic acid water-reducing agent, a method for preparing the same and a use thereof. The multitype-adsorptive-group polycarboxylic acid water-reducing agent has the characteristics of high water reduction and good adaptability.

According to the present invention, the multitype-adsorptive-group polycarboxylic acid water-reducing agent consists of 30-60 wt % of a macromolecule with multitype-adsorptive groups and water, the macromolecule with the multitype-adsorptive groups has a polyethylene glycol side chain, wherein adsorption groups of the polymer backbone comprise a carboxylic acid group, a sulfonic acid group and a phosphonic acid group, and the phosphonic acid group is linked to the backbone of the macromolecule with the multitype-adsorptive groups by nucleophilic addition. The diversity of the adsorption groups of the multitype-adsorptive-group polycarboxylic acid water-reducing agent allows the water-reducing agent to have good adaptability to different cementitious material systems.

Preferably, a molecular weight of the macromolecule with the multitype-adsorptive groups ranges from 20.0 kDa to 35.0 kDa.

Preferably, a molecular structure of the macromolecule with the multitype-adsorptive groups has the following polymer chain segments:

(1) a polymer chain segment including at least one structural unit 1 as shown in Formula 1:

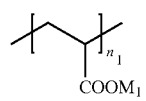

Formula 1 in which $M_1$ is H or Na;

(2) a polymer chain segment including at least one structural unit 2 as shown in Formula 2:

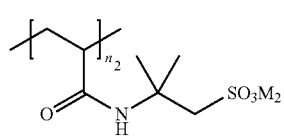

Formula 2 in which $M_2$ is H or Na;

(3) a polymer chain segment including a structural unit 3 as shown in Formula 3:

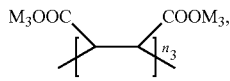

Formula 3 in which $M_3$ is H or Na;

(4) a polymer chain segment including at least one structural unit 4 as shown in Formula 4:

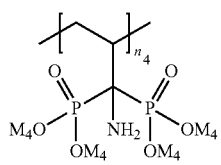

Formula 4 in which $M_4$ is H or Na;

(5) a polymer chain segment including at least one structural unit 5 as shown in Formula 5:

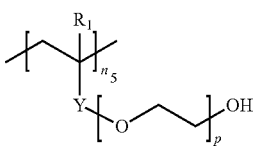

Formula 5 in which, $R_1$ is H or methyl, Y is a C1-C4 saturated alkylene group or a C2-C5 saturated linear alkyleneoxy group (—O—C2~C5-), and p is a number from 15 to 55.

Preferably, in every 100 parts by mass of the macromolecule with the multitype-adsorptive groups, a mass ratio of the structural units 1 to 5 is 6-14:2.5-4.5:0-6:16-36:45-75; a weight-average molecular weight of the multitype-adsorptive-group water-reducing agent ranges from 20.0 kDa to 35.0 kDa. Values of n1-n5 are selected so that each structural unit satisfies the above ranges of the mass ratio and the weight-average molecular weight.

Preferably, respective structural units in the polymer chain of the macromolecule with the multitype-adsorptive groups are randomly distributed.

Preferably, a method for preparing the multitype-adsorptive-group polycarboxylic acid water-reducing agent includes: preparing an intermediate of the water-reducing agent containing a cyano group and a sulfonic group by free radical copolymerization with acrylic acid, 2-acrylamido-2-methylpropanesulfonic acid, maleic anhydride, acrylonitrile and unsaturated polyethylene glycol as raw materials; and performing nucleophilic addition of the cyano group in a molecule of the intermediate and phosphorous acid under catalysis of the sulfonic acid group in the molecule to obtain the multitype-adsorptive-group polycarboxylic acid water-reducing agent.

A specific method includes following steps:

(1) adding water to 70-85 parts by mass of unsaturated polyethylene glycol E to prepare a solution with a mass concentration of 40-60%; dropwise adding an initiator N into the solution, stirring uniformly to obtain a solution I, and then adding a monomer mixture II and a solution III containing a reductant and a chain transfer agent into the solution I simultaneously at a constant speed at a temperature of 30-60° C., with an addition time for the monomer mixture II being 1-4 hours and an addition time for the solution III being 1.25-5 hours, which is 15-60 min longer then the addition time for the monomer mixture II; after additions, vacuum dehydrating an obtained crude product solution IV at 100° C., cooling, and pulverizing an obtained solid into particles with a diameter smaller than or equal to 0.5 cm to obtain an intermediate V; and (2) taking 80 parts of the intermediate V, adding phosphorous acid, uniformly mixing, heating to 110-150° C., reacting for 8-24 hours, discharging, and adding water to prepare a solution with a mass concentration of 30-60%, during which process sodium hydroxide is added to neutralize a product to obtain the multitype-adsorptive-group polycarboxylic acid water-reducing agent.

Preferably, in the step (1), the unsaturated polyethylene glycol E has a structure as follows:

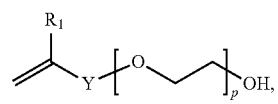

Formula 6 in which, definitions or value ranges of $R_1$, Y, and p are the same as those in the structural unit 5 in Formula 5.

In the step (1), the initiator N is a water-soluble oxidative free radical polymerization initiator selected from the group consisting of sodium, potassium, and ammonium salts of persulphuric acid, hydrogen peroxide and tert-butyl hydroperoxide. The molar amount of the initiator N is 1.5%-3.0% of a total molar amount of all monomers in the reaction, and a mass of the initiator N is calculated based on this relationship.

In the step (1), the monomer mixture II is a mixture of the following four types of substances: (1) acrylic acid; (2) 2-acrylamido-2-methylpropanesulfonic acid; (3) maleic anhydride; and (4) acrylonitrile. After polymerization, they correspond to precursors of structural units 1, 2, 3 and 4, respectively.

In the monomer mixture II, mass ranges of the (1)-(4) monomers are 7-15 parts by mass, 3-5 parts by mass, 0-6 parts by mass and 5-10 parts by mass, respectively.

The reductant may be a reductant which is reactable with the initiator N in a redox reaction that generates free radicals, and examples include sodium bisulfite, formaldehyde sodium sulfoxylate and ascorbic acid. The molar amount of the reductant is ½-⅛ of a molar amount of the initiator.

The chain transfer agent is a C2-C6 water-soluble sulfhydryl compound including other functional groups in addition to the sulfhydryl group, for example, mercaptoethanol, mercaptopropionic acid and mercaptoacetic acid. A dosage amount of the chain transfer agent is 1.5-2.5% of a total molar amount of all monomers in the unsaturated polyethylene glycol macromonomer and the monomer mixture II.

In the step (2), 1,1'-amino bisphosphonic acid structure is formed by the intramolecular autocatalytic nucleophilic addition of the intermediate macromolecule and phosphorous acid. In this reaction, the intramolecular cyano group is protonated by the intramolecular sulfonic acid group and is therefore activated; and the activated cyano group and phosphorous acid are then subjected to nucleophilic addition to obtain the above structure. The reaction process is as follows:

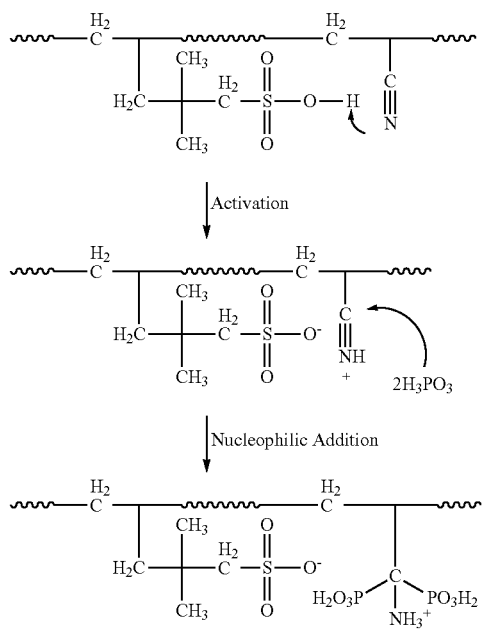

FIG. 1 Chemical Mechanism of the Preparation Method of the Present Invention

Preferably, in the step (2), the molar amount of phosphorous acid is 2.0-2.5 times a molar amount of acrylonitrile in the step (1), and the mass thereof is calculated based on this relationship.

Preferably, in the step (2), sodium hydroxide is added in a form of a solid or an aqueous solution with a mass concentration of more than 20%, and a molar amount of the sodium hydroxide is 30-100% of a total molar amount of acidic hydrogen in all acidic reactants.

The present invention further provides a use of the multitype-adsorptive-group polycarboxylic acid water-reducing agent as a water-reducing agent for various portland cement concretes; a solid dosage of the water-reducing agent is 0.06 to 0.15% of a mass of a cementitious material. Below this value, the effects of water reduction and dispersion are insufficient; above this value, there will be no significant marginal benefit if the dosage is increased, and negative effects such as slurry bleeding and segregation are likely to occur.

The method has the advantages that:

(1) By autocatalytic nucleophilic addition, a uniquely structured bisphosphonate aminomethyl structure bonded to the molecular chain through a carbon-carbon bond is introduced into polycarboxylic acid with high atomic efficiency and less three wastes. The problem of hydrolysis of ester-type monomers containing phosphoric (phosphonic) acid groups is avoided.

(2) The obtained multitype-adsorptive-group polycarboxylic acid water-reducing agent has various groups with different calcium complexing activities in its molecule, and the advantages are complementary, so it has the advantages of wide cement adaptability and long slump resistance time.

BRIEF DESCRIPTION OF DRAWINGS

FIGS. 1a-1d show the adaptability of respective examples to different types of concrete and sand: (a) conch cement, different types of sand, slump; (b) Onoda cement, different types of sand, slump; (c) bleeding rate; (d) gas content.

DETAILED DESCRIPTION

The content of the present invention will be further illustrated with examples below, but the content of the present invention is not limited to the following examples. All equivalent changes or modifications made according to the essence of the method of the present invention should be covered within the protection scope of the present invention.

In the examples of the present invention, the molecular weight of the polymer is measured by a gel permeation chromatograph (GPC) of Wyatt Technology Corporation. The experimental was conducted under following conditions: gel column: two series-connected chromatographic columns of Shodex SB806+803; cleaning solution: 0.1M $NaNO_3$ solution;

Mobile phase velocity: 1.0 mL/min; injection: 20 uL of 0.5% aqueous solution; detector: Shodex RI-71 differential refractive index detector; standard substance: sodium polystyrene sulfonate GPC standard samples (Sigma-Aldrich, molecular weights: 344100, 195800, 108200, 60000, 37500, 28200, 6900, 3000, 1400).

EXAMPLE 1

(1) Water was added to 70 parts by mass of allyl polyethylene glycol E-1 with a weight-average molecular weight of 720 to prepare a solution with a mass concentration of 40%; 3.55 parts by mass of ammonium persulfate was added as an initiator and stirred uniformly to obtain a solution I-1; a mixed solution II-1 containing 15 parts of acrylic acid, 5 parts of 2-acrylamido-2-methylpropanesulfonic acid and 10 parts of acrylonitrile and a solution III-1 containing 0.81 part by mass of sodium bisulfite and 0.55 part by mass of mercaptopropionic acid were added dropwise into the solution I simultaneously at a constant speed at 60° C., with the addition time for the solution II-1 being 2 hours and the addition time for the solution III-1 being 2.5 hours; after addition, an obtained crude product solution IV-1 was vacuum dehydrated at 100° C., and cooled, and an obtained solid was pulverized into particles with a diameter smaller than or equal to 0.5 cm to obtain an intermediate V-1;

(2) 24.8 parts by mass of phosphorous acid was added into 80 parts by mass of the intermediate V-1, uniformly mixed, heated to 110° C., reacted for 16 h and discharged; and water and 7.3 parts by mass of caustic soda flakes were added to neutralize and prepare a solution with a mass concentration of 60%, thus obtaining a multitype-adsorptive-group polycarboxylic acid water-reducing agent P-1 (with a weight-average molecular weight of $2.16 \times 10^4$ g/mol, and a conversion rate of 92.2%).

EXAMPLE 2

(1) Water was added to 74 parts by mass of methyl allyl polyethylene glycol E-2 with a weight-average molecular weight of 1200 to prepare a solution with a mass concentration of 45%; 0.73 part by mass of tert-butyl hydroperoxide was added as an initiator and stirred uniformly to obtain a solution I-2; then, a mixed solution II-2 containing 8 parts of acrylic acid, 4 parts of 2-acrylamido-2-methylpropanesulfonic acid, 6 parts of maleic anhydride and 8 parts of acrylonitrile and a solution III-2 containing 0.36 part by mass of ascorbic acid and 0.56 parts by mass of mercaptoacetic acid were added dropwise into the solution I simultaneously at a constant speed at 45° C., with the addition time for the solution II-2 being 1 hour and the addition time for the solution III-2 being 1.25 hours; after addition, an obtained crude product solution IV-2 was vacuum dehydrated at 100° C., and cooled, and an obtained solid was pulverized into particles with a diameter smaller than or equal to 0.5 cm to obtain an intermediate V-2;

(2) 21.8 parts by mass of phosphorous acid was added into 80 parts of the intermediate V-2, uniformly mixed, heated to 120° C., reacted for 8 h and discharged; water and a caustic soda liquid containing 12.8 parts by mass of sodium hydroxide were added to neutralize and prepare a 50% solution, thus obtaining a multitype-adsorptive-group polycarboxylic acid water-reducing agent P-2 (with a weight-average molecular weight of $2.29 \times 10^4$ g/mol, and a conversion rate of 88.9%).

EXAMPLE 3

(1) Water was added to 78 parts by mass of methyl butenyl polyethylene glycol E-3 with a weight-average molecular weight of 1600 to prepare a solution with a mass concentration of 50%; 1.19 parts by mass of ammonium persulfate was added as an initiator and stirred uniformly to obtain a solution I-3; then, a mixed solution II-3 containing 12 parts of acrylic acid, 4 parts of 2-acrylamido-2-methylpropanesulfonic acid and 6 parts of acrylonitrile and a solution III-3 containing 0.18 part by mass of sodium bisulfite and 0.74 part by mass of mercaptopropionic acid were added dropwise into the solution I simultaneously at a constant speed at 55° C., with the addition time for the solution II-3 being 3 hours and the addition time for the solution III-3 being 3.5 hours; after addition, an obtained crude product solution IV-3 was vacuum dehydrated at 100° C., and cooled, and an obtained solid was pulverized into particles with a diameter smaller than or equal to 0.5 cm to obtain an intermediate V-3;

(2) 17.5 parts by mass of phosphorous acid was added into 80 parts of the intermediate V-3, uniformly mixed, heated to 135° C., reacted with stirring for 12 h and discharged; water and a caustic soda liquid containing 13.2 parts by mass of sodium hydroxide were added to neutralize and prepare a 40% solution, thus obtaining a multitype-adsorptive-group polycarboxylic acid water-reducing agent P-3 (with a weight-average molecular weight of $2.43 \times 10^4$ g/mol, and a conversion rate of 90.9%).

EXAMPLE 4

(1) Water was added to 82 parts by mass of vinyl-4-butoxy polyethylene glycol E-4 with a weight-average molecular weight of 1900 to prepare a solution with a mass concentration of 55%; 0.81 part by mass of 30% hydrogen peroxide was added as an initiator and stirred uniformly to obtain a solution I-4; then, a mixed solution II-4 containing 8 parts of acrylic acid, 4 parts of 2-acrylamido-2-methylpropanesulfonic acid and 6 parts of acrylonitrile and a solution III-4 containing 0.14 part by mass of formaldehyde sodium sulfoxylate and 0.45 part by mass of mercaptoethanol were added dropwise into the solution I simultaneously at a constant speed at 30° C., with the addition time for the solution II-4 being 3.5 hours and the addition time for the solution III-4 being 4 hours; after addition, an obtained crude product solution IV-4 was vacuum dehydrated at 100° C., and cooled, and an obtained solid was pulverized into particles with a diameter smaller than or equal to 0.5 cm to obtain an intermediate V-4;

(2) 17.8 parts by mass of phosphorous acid was added into 80 parts by mass of the intermediate V-4, uniformly mixed, heated to 140° C., reacted with stirring for 20 h and discharged; water and a caustic soda liquid containing 14.3 parts by mass of sodium hydroxide were added to neutralize and prepare a 30% solution, thus obtaining a multitype-adsorptive-group polycarboxylic acid water-reducing agent P-4 (with a weight-average molecular weight of $2.75 \times 10^4$ g/mol, and a conversion rate of 91.2%).

EXAMPLE 5

(1) Water was added to 85 parts by mass of vinyl-4-butoxy polyethylene glycol E-5 with a weight-average molecular weight of 2300 to prepare a solution with a mass concentration of 60%; 0.66 part by mass of tert-butyl hydroperoxide was added as an initiator and stirred uniformly to obtain a solution I-5; a mixed solution II-5 containing 8 parts of acrylic acid, 3 parts of 2-acrylamido-2-methylpropanesulfonic acid and 4 parts of acrylonitrile and a solution III-5 containing 0.32 part by mass of ascorbic acid and 0.64 part by mass of mercaptopropionic acid were added dropwise into the solution I simultaneously at a constant speed at 35° C., with the addition time for the solution II-5 being 4 hours and the addition time for the solution III-5 being 5 hours; after addition, an obtained crude product solution IV-5 was vacuum dehydrated at 100° C., and cooled, and an obtained solid was pulverized into particles with a diameter smaller than or equal to 0.5 cm to obtain an intermediate V-5;

(2) 12.4 parts by mass of phosphorous acid was added into 80 parts by mass of V-5, uniformly mixed, heated to 150° C., reacted with stirring for 24 h and discharged; water was added to prepare a 50% solution, thus obtaining a multitype-adsorptive-group polycarboxylic acid water-reducing agent P-5 (with a weight-average molecular weight of $3.11 \times 10^4$ g/mol, and a conversion rate of 90.7%).

EXAMPLE 6

(1) Water was added to 80 parts by mass of methyl butenyl polyethylene glycol E-5 with a weight-average molecular weight of 1800 to prepare a solution with a mass concentration of 50%; 1.72 parts by mass of ammonium persulfate was added as an initiator and stirred uniformly to obtain a solution I-6; then, a mixed solution II-6 containing 10 parts of acrylic acid, 5 parts of 2-acrylamido-2-methylpropanesulfonic acid and 5 parts of acrylonitrile and a solution III-6 containing 0.39 part by mass of sodium bisulfite and 0.59 part by mass of mercaptoethanol were added dropwise into the solution I simultaneously at a constant speed at 45° C., with the addition time for the solution II-6 being 2.5 hours and the addition time for the solution III-6 being 3 hours; after addition, an obtained crude product solution IV-6 was vacuum dehydrated at 100° C., and cooled, and an obtained solid was pulverized into particles with a diameter smaller than or equal to 0.5 cm to obtain an intermediate V-6;

(2) 13.6 parts by mass of phosphorous acid was added into 80 parts by mass of the intermediate V-6, uniformly mixed, heated to 135° C., reacted with stirring for 18 h and discharged; water and a caustic soda liquid containing 5.6 parts by mass of sodium hydroxide was added to neutralize and prepare a 50% solution, thus obtaining a multitype-adsorptive-group polycarboxylic acid water-reducing agent P-6 (with a weight-average molecular weight of $2.98 \times 10^4$ g/mol, and a conversion rate of 89.5%).

EXAMPLE 7

(1) Water was added to 76 parts by mass of methyl allyl polyethylene glycol E-7 with a weight-average molecular weight of 1500 to prepare a solution with a mass concentration of 45%; 0.83 part by mass of 30% hydrogen peroxide was added as an initiator and stirred uniformly to obtain a solution I-7; then, a mixed solution II-7 containing 13 parts of acrylic acid, 5 parts of 2-acrylamido-2-methylpropanesulfonic acid and 6 parts of acrylonitrile and a solution III-7 containing 0.32 part by mass of ascorbic acid and 0.78 part by mass of mercaptopropionic acid were added dropwise into the solution I simultaneously at a constant speed at 50° C., with the addition time for the solution II-7 being 2 hours and the addition time for the solution III-7 being 2.5 hours; after addition, an obtained crude product solution IV-7 was vacuum dehydrated at 100° C., and cooled, and an obtained solid was pulverized into particles with a diameter smaller than or equal to 0.5 cm to obtain an intermediate V-7;

(2) 18.2 parts by mass of phosphorous acid was added into 80 parts by mass of the intermediate V-7, uniformly mixed, heated to 120° C., reacted with stirring for 12 h and discharged; water and a caustic soda liquid containing 10.3 parts by mass of sodium hydroxide was added to neutralize and prepare a 50% solution, thus obtaining a multitype-adsorptive-group polycarboxylic acid water-reducing agent P-7 (with a weight-average molecular weight of $2.70 \times 10^4$ g/mol, and a conversion rate of 90.1%).

EXAMPLE 8

(1) Water was added to 76 parts by mass of methyl allyl polyethylene glycol E-8 with a weight-average molecular weight of 1500 to prepare a solution with a mass concentration of 50%; 0.80 part by mass of 30% hydrogen peroxide was added as an initiator and stirred uniformly to obtain a solution I-8; then, a mixed solution II-8 containing 9 parts of acrylic acid, 5 parts of 2-acrylamido-2-methylpropanesulfonic acid, 4 parts by mass of maleic anhydride and 6 parts of acrylonitrile and a solution III-8 containing 0.18 part by mass of formaldehyde sodium sulfoxylate and 0.75 part by mass of mercaptopropionic acid were added dropwise into the solution I simultaneously at a constant speed at 50° C., with the addition time for the solution II-8 being 2 hours and the addition time for the solution III-8 being 2.5 hours; after addition, an obtained crude product solution IV-8 was vacuum dehydrated at 100° C., and cooled, and an obtained solid was pulverized into particles with a diameter smaller than or equal to 0.5 cm to obtain an intermediate V-8;

(2) 15.6 parts by mass of phosphorous acid was added into 80 parts by mass of the intermediate V-8, uniformly mixed, heated to 125° C., reacted with stirring for 12 h and discharged; water and a caustic soda liquid containing 12.3 parts by mass of sodium hydroxide was added to neutralize and prepare a 50% solution, thus obtaining a multitype-adsorptive-group polycarboxylic acid water-reducing agent P-8 (with a weight-average molecular weight of $2.57 \times 10^4$ g/mol, and a conversion rate of 88.7%).

COMPARATIVE EXAMPLE 1

In this comparative example, in order to illustrate the necessity of phosphonic acid structural units in the water-reducing agent of the present invention for improving the efficiency of the water-reducing agent, acrylonitrile was equimolarly replaced with acrylic acid, and the subsequent phosphonation step was omitted. The process of this comparative example was based on the process of Example 3: water was added to 78 parts by mass of methyl butenyl polyethylene glycol E-r1 with a weight-average molecular weight of 1600 to prepare a solution with a mass concentration of 50%; 1.19 parts by mass of ammonium persulfate was added as an initiator and stirred uniformly to obtain a solution I-r1; then, a mixed solution II-r1 containing 20.2 parts of acrylic acid and 4 parts of 2-acrylamido-2-methylpropanesulfonic acid and a solution III-r1 containing 0.18 part by mass of sodium bisulfite and 0.74 part by mass of mercaptopropionic acid were added dropwise into the solution I simultaneously at a constant speed at 55° C., with the addition time for the solution II-r1 being 3 hours and the addition time for the solution III-r1 being 3.5 hours; after addition, a caustic soda liquid containing 9.6 parts by mass of sodium hydroxide was added to neutralize, thus obtaining a water-reducing agent P-r1 (with a weight-average molecular weight of $2.29 \times 10^4$ g/mol, and a conversion rate of 92.0%).

COMPARATIVE EXAMPLE 2

In this comparative example, in order to illustrate the superiority of the preparation method of the phosphonic acid structural units of the present invention in the efficacy of the obtained water-reducing agent over other phosphonic acid monomers, acrylonitrile was equimolarly replaced with a typical phosphoric acid-based monomer, 2-hydroxyethyl methacrylate phosphate, and the subsequent phosphonation step was omitted. The process of this comparative example was based on Example 3:

(1) Water was added to 78 parts by mass of methyl butenyl polyethylene glycol E-r2 with a weight-average molecular weight of 1600 to prepare a solution with a mass concentration of 50%; 1.19 parts by mass of ammonium persulfate was added as an initiator and stirred uniformly to obtain a solution I-r2; then, a mixed solution II-r2 containing 12 parts of acrylic acid, 4 parts of 2-acrylamido-2-methylpropanesulfonic acid, and 25.8 parts by mass of 2-hydroxyethyl methacrylate phosphate and a solution III-r2 containing 0.18 part by mass of sodium bisulfite and 0.74 part by mass of mercaptopropionic acid were added dropwise into the solution I simultaneously at a constant speed at 55° C., with the addition time for the solution II-r2 being 3 hours and the addition time for the solution III-r2 being 3.5 hours; after addition, a caustic soda liquid containing 9.6 parts by mass of sodium hydroxide was added to neutralize, thus obtaining a water-reducing agent P-r2 (with a weight-average molecular weight of $2.55 \times 10^4$ g/mol, and a conversion rate of 88.7%).

COMPARATIVE EXAMPLE 3

This comparative example is a typical synthesis process of an ester-type polycarboxylic acid water-reducing agent, for the purpose of comparing the efficacy of the examples with that of a typical ester-type polycarboxylic acid water-reducing agent.

120 parts by mass of methoxy polyethylene glycol (Mw=1200), 10 parts by mass of methacrylic acid, 0.6 part by mass of p-toluenesulfonic acid, 0.05 part by mass of phenothiazine and 16 parts by mass of toluene were added into a reflux reactor with a water separation device, heated and refluxed at 130° C. until more than 1.75 parts by mass of water was discharged, and the toluene was removed under reduced pressure to obtain a methoxy polyethylene glycol (1200) methacrylate macromonomer.

In the reactor, 60 parts of water and 0.65 part by mass of hydrogen peroxide were added and stirred uniformly to obtain a solution I-r1. At the same time, 65 parts by mass of methoxypolyethylene glycol (1000) methacrylate, 16.5 parts by mass of methacrylic acid, 0.25 part by mass of vitamin C and 0.60 part by mass of mercaptopropionic acid were uniformly mixed to obtain a solution II-r3, and the solution II-r3 was dropwise added into the solution I-r3 at a constant speed at 40° C. under the protection of nitrogen over an addition time of 2.5 h; the reaction was continued for 1 h at 40° C., and the pH of the obtained solution was adjusted to 5-6 by a caustic soda liquid after the reaction was completed to obtain the ester-type polycarboxylic acid water-reducing agent P-r3 of the comparative example (Mw=2.22×10$^4$, with a conversion rate of 92.3%).

COMPARATIVE EXAMPLE 4

This comparative example is a typical synthesis process of an ether-type polycarboxylic acid water-reducing agent, for the purpose of comparing the efficacy of the examples with that of a typical ether-type polycarboxylic acid water-reducing agent.

In a reactor, 80 parts by mass of methyl allyl polyethylene glycol (2000), 80 parts by mass of water and 0.60 part by mass of 30% hydrogen peroxide were added and mixed evenly to obtain a solution I-r4, and 0.26 part by mass of ascorbic acid, 0.64 part by mass of mercaptopropionic acid and 49.1 parts by mass of water were mixed to obtain a solution II-r4. Under that protection of nitrogen at 45° C., the solution II-r4 and 14.4 parts by mass of acrylic acid were added dropwise simultaneously into the solution I-r4 at a constant speed, with the dropwise addition time of II-r4 being 3 h, the dropwise addition time of acrylic acid being 2.5 h; then reaction was continued at 45° C. for 1 h. After the reaction was completed, the pH of the obtained solution was adjusted to 5-6 by using a caustic soda liquid to obtain the ether-type polycarboxylic acid water-reducing agent P-r4 of the comparative example. (Mw=2.69×10$^4$, with a conversion rate of 89.7%).

Performance Evaluation of the Examples

Cement Paste Fluidity Test

The dispersion effects of various cements of the embodiments of the present invention were first evaluated in a paste fluidity test. The test procedure was in accordance with GB/T8077-2000 Standard. 300 g cement was used, and a water-cement ratio is 0.29 in the test. The cements used were reference cement (P.I. 42.5), Onoda cement (P. II. 52.5), Helin cement (P.O. 42.5), Conch cement (P.O. 42.5), and Zhongshan cement (P.O. 42.5). The cement components were quantitatively determined by XRD. All tests were carried out at 20° C., and the dosage of the water-reducing agent used in the paste fluidity test was 0.10%.

TABLE 1

Type and composition of the cement used in evaluation experiment of the examples

| Cement | Type | XRD quantification | | | | | |
|---|---|---|---|---|---|---|---|
| | | C3S | C2S | C3A | C4AF | limestone | gypsum |
| Reference cement | P.I. 42.5 | 57.3 | 17.0 | 8.5 | 7.3 | <0.1 | 5.3 |
| Onoda cement | P. II.52.5 | 55.9 | 15.8 | 6.8 | 6.4 | 3.3 | 6.0 |
| Conch cement | P.O.42.5 | 49.7 | 13.1 | 6.1 | 4.6 | 4.0 | 5.8 |
| Helin cement | P.O. 42.5 | 45.3 | 14.2 | 5.3 | 4.2 | 1.2 | 5.5 |
| Zhongshan cement | P.O. 42.5 | 50.6 | 14.5 | 6.4 | 5.0 | 2.8 | 6.1 |

TABLE 2

Water reducing efficiency of various examples and comparative examples on different types of cement pastes

| Example | Reference cement | | Onoda cement | | Conch cement | | Helin cement | | Zhongshan cement | |
|---|---|---|---|---|---|---|---|---|---|---|
| | 4 min | 60 min | 4 min | 60 min | 4 min | 60 min | 4 min | 60 min | 4 min | 60 min |
| P-1 | 212 | 214 | 238 | 240 | 219 | 224 | 200 | 197 | 212 | 215 |
| P-2 | 221 | 217 | 248 | 246 | 234 | 234 | 213 | 204 | 224 | 223 |
| P-3 | 239 | 228 | 266 | 259 | 254 | 248 | 233 | 216 | 247 | 240 |
| P-4 | 217 | 207 | 241 | 232 | 225 | 220 | 204 | 190 | 223 | 217 |
| P-5 | 228 | 214 | 252 | 238 | 239 | 231 | 217 | 198 | 229 | 220 |
| P-6 | 226 | 212 | 254 | 240 | 236 | 228 | 221 | 202 | 229 | 220 |
| P-7 | 230 | 219 | 261 | 251 | 243 | 238 | 220 | 205 | 241 | 235 |
| P-8 | 234 | 224 | 257 | 247 | 247 | 237 | 226 | 210 | 233 | 227 |
| P-r1 | 193 | 158 | 208 | 177 | 197 | 178 | 178 | 148 | 188 | 170 |
| P-r2 | 187 | 183 | 216 | 207 | 209 | 201 | 188 | 176 | 203 | 198 |
| P-r3 | 193 | 156 | 213 | 181 | 198 | 178 | 185 | 154 | 196 | 176 |
| P-r4 | 213 | 163 | 240 | 204 | 205 | 183 | 204 | 170 | 202 | 188 |

The above results show that the initial fluidity of the reference cement and Onoda cement with a lower filler content using each example was generally superior to that using the typical conventional water-reducing agents in comparative examples 3 and 4, P-1 has relatively lower efficacy among the examples, and P-r4 was substantially equivalent to P-1 in efficacy. However, all examples behaved better than P-r4 and P-r3 in the three P.O.42.5 cements with a higher admixture content. Among the various examples, the effects of examples 3, 7, and 8 have better effects. The reasons for the overall better efficacy performance of the examples are that the water-reducing agents in the examples contain phosphonated groups with higher calcium ion complexing ability, which form a gradient supplement of complexing activity with carboxyl sulfonic acid groups, thereby better adapting to the microscopic characteristics (such as components, surface activity and the like) of different cements and admixtures and thus showing a better macroscopic performance.

Meanwhile, the above results show that the comparative example P-r1 lacking a phosphonic acid group and the P-r2 of the test ester-type phosphonic acid monomer were both much less effective than the examples, which demonstrates the necessity of the structural characteristics and the preparation process of the water-reducing agents of the present invention for ensuring the effects thereof.

Thereafter, that adaptability of the above admixture was further tested by the above tests of fluidity and bleeding rate of different types of concrete, and the results are shown in the following table. In the test, Onoda cement and Conch cement with representative difference in composition among the above cements were selected, and the river sand and machine-made sand were selected for the sand. In addition to the above materials, grades of other materials were all in accordance with the GB8076-2008 standard, and the proportion of the concrete was also designed based on this standard, as shown in the following table. The bleeding rate test procedure was in accordance with GB50080-2016. Sine there are many variables in the test, P-1, P-3 and P-8, which were more representative in efficacies in the above examples, and P-r3 and P-r4, which were compared as conventional water-reducing agents, were selected and tested. In the test, the solid dosage of each example was 0.15%. The mixing ratio of the concrete was designed as follows.

TABLE 3

Concrete mixing proportion used in the test

| Cement | Water | Sand | Pebble | Boulder |
|--------|-------|------|--------|---------|
| 360    | 150   | 820  | 408    | 612     |

TABLE 4

Basic parameters of sand used in the test

| Sand | Silt content | fineness modulus |
|------|--------------|------------------|
| Clean river sand | <1.0 | 2.78 |
| Machine-made sand | 3.1 | 2.82 |

For the experimental results of the adaptability of each example to different types of concrete and sand, see FIG. 1 of the specification. The three typical examples P-1, P-3 and P-8 all show relatively stable efficacy performance, superior to the comparative P-r3 and P-r4, and the cement dispersion performance and the air content and bleeding rate of the obtained concrete are less affected by the type of the cement and the quality of the sand material; the comparative P-r3 and P-r4 can still show a slightly lower efficacy in the river sand concrete system with fewer impurities than the examples, but when the sand material is replaced with the machine-made sand with a certain silt content, the slump, bleeding rate and air content indexes of the P-r3 and P-r4 worsened drastically, which is significantly different from the examples, verifying the good adaptability of the examples of the present invention to cements and aggregates, as well as the tolerance to clay. This adaptability stems from the diversified distribution of the adsorption groups of calcium complexing activity represented by the phosphonic acid group on its backbone. In addition, although Example 1 showed a smaller efficacy in that above paste fluidity test than the other examples, in this round of testing, due to its shorter polyethylene glycol chain and relatively high phosphonic acid group content, it showed better tolerance to machine-made sand having a certain silt content than Examples 3 and 8, which objectively confirms the necessity of the value range of the chain length of the unsaturated polyethylene glycol monomer according to the present invention.

What is claimed is:

1. A multitype-adsorptive-group polycarboxylic acid water-reducing agent, consisting of 30-60 wt % of a macromolecule with multitype-adsorptive groups and water, wherein the macromolecule with the multitype-adsorptive groups has a polyethylene glycol side chain and a polymer backbone, wherein adsorption groups of the polymer backbone comprise a carboxylic acid group, a sulfonic acid group and a phosphonic acid group, and the phosphonic acid group is linked to the backbone of the macromolecule with the multitype-adsorptive groups by nucleophilic addition, wherein a molecular structure of the macromolecule with the multitype-adsorptive groups has following polymer chain segments:
(1) a polymer chain segment comprising at least one structural unit 1 represented by Formula 1:

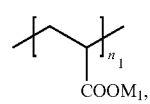

Formula 1 wherein $M_1$ is H or Na;
(2) a polymer chain segment comprising at least one structural unit 2 represented by Formula 2:

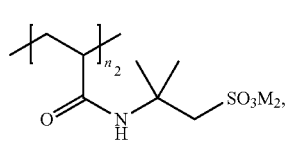

Formula 2 wherein $M_2$ is H or Na;
(3) a polymer chain segment comprising at least one structural unit 4 represented by Formula 4:

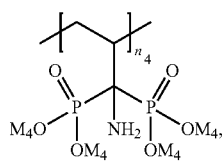

Formula 4 wherein $M_4$ is H or Na; and
(4) a polymer chain segment comprising at least one structural unit 5 represented by Formula 5:

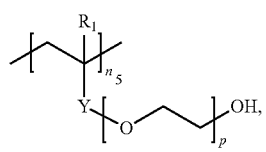

Formula 5 wherein $R_1$ is H or methyl, Y is a $C_1$-$C_4$ saturated alkylene group or a $C_2$~$C_5$ saturated linear alkyleneoxy group (—O—$C_2$~$C_5$—), and P is a number from 15 to 55.

2. The multitype-adsorptive-group polycarboxylic acid water-reducing agent according to claim 1, wherein a molecular weight of the macromolecule with the multitype-adsorptive groups ranges from 20.0 kDa to 35.0 kDa.

3. The multitype-adsorptive-group polycarboxylic acid water-reducing agent according to claim 1, wherein the molecular structure of the macromolecule with the multitype-adsorptive groups has a following polymer chain segment comprising a structural unit 3 represented by Formula 3:

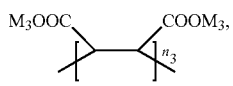

Formula 3 wherein $M_3$ is H or Na.

4. The multitype-adsorptive-group polycarboxylic acid water-reducing agent according to claim 3, wherein, in every 100 parts by mass of the macromolecule with the multitype-adsorptive groups, a mass ratio of the structural units 1 to 5 is 6-14:2.5-4.5:0-6:16-36:45-75; and in a polymer chain of the macromolecule with the multitype-adsorptive groups, respective structural units are randomly distributed.

5. A method for preparing the multitype-adsorptive-group polycarboxylic acid water-reducing agent according to claim 1, the method comprising: preparing an water-reducing agent intermediate containing a cyano group and a sulfonic group by free radical copolymerization with acrylic acid, 2-acrylamido-2-methylpropanesulfonic acid, maleic anhydride, acrylonitrile and unsaturated polyethylene glycol as raw materials; and performing nucleophilic addition of the cyano group in a molecule of the intermediate and phosphorous acid under catalysis of the sulfonic acid group in the molecule to obtain the multitype-adsorptive-group polycarboxylic acid water-reducing agent.

6. The method according to claim 5, comprising following specific preparation process steps:
(1) adding water to 70-85 parts by mass of unsaturated polyethylene glycol E to prepare a solution with a mass concentration of 40-60%; adding an initiator N into the solution, stirring uniformly to obtain a solution I, and then dropwise adding a monomer mixture II and a solution III containing a reductant and a chain transfer agent into the solution I simultaneously at a constant speed at a temperature of 30-60° C., with an addition time for the monomer mixture II being 1-4 hours and an addition time for the solution III being 1.25-5 hours, which is 15-60 min longer then the addition time for the monomer mixture II; after additions, vacuum dehydrating an obtained crude product solution IV at 100° C., cooling, and pulverizing an obtained solid into particles with a diameter smaller than or equal to 0.5 cm to obtain an intermediate V, wherein the monomer mixture II is a mixture of following four types of substances: (1) acrylic acid; (2) 2-acrylamido-2-methylpropanesulfonic acid; (3) maleic anhydride; and (4) acrylonitrile; and (2) taking 80 parts of the intermediate V, adding phosphorous acid, uniformly mixing, heating to 110-150° C., reacting for 8-24 hours, discharging, and adding water to prepare a solution with a mass concentration of 30-60%, during which process sodium hydroxide is added to neutralize a product to obtain the multitype-adsorptive-group polycarboxylic acid water-reducing agent.

7. The method according to claim 6, wherein, in the step (1), the unsaturated polyethylene glycol E has a structure as follows:

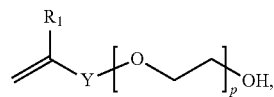

Formula 6 wherein definitions or value ranges of $R_1$, Y, and p are the same as those in the structural unit 5 represented by Formula 5;

in the step (1), the initiator N is a water-soluble oxidative free radical polymerization initiator selected from the group consisting of sodium, potassium, and ammonium salts of persulphuric acid, hydrogen peroxide and tert-butyl hydroperoxide, with a molar amount of 1.5%-3.0% of a total molar amount of all monomers in the reaction;

in the monomer mixture II, mass ranges of the (1)-(4) monomers are 7-15 parts by mass, 3-5 parts by mass, 0-6 parts by mass and 5-10 parts by mass, respectively;

the reductant is a reductant which is reactable with the initiator N in a redox reaction that generates free radicals and is selected from the group consisting of sodium bisulfite, formaldehyde sodium sulfoxylate and ascorbic acid; and a molar amount of the reductant is ½-⅛ of a molar amount of the initiator;

the chain transfer agent is a $C_2$-$C_6$ water-soluble sulfhydryl compound selected from the group consisting of mercaptoethanol, mercaptopropionic acid and mercaptoacetic acid, and a dosage amount of the chain transfer agent is 1.5-2.5% of a total molar amount of all monomers in the unsaturated polyethylene glycol macromonomer and the monomer mixture II.

8. The method according to claim 6, wherein, in the step (2), a molar amount of phosphorous acid is 2.0-2.5 times a molar amount of acrylonitrile in the step (1).

9. The method according to claim 6, wherein in the step (2), sodium hydroxide is added in a form of a solid or an aqueous solution with a mass concentration of more than 20%, and a molar amount of sodium hydroxide is 30-100% of a total molar amount of acidic hydrogen in all acidic reactants.

10. The method of using the multitype-adsorptive-group polycarboxylic acid water-reducing agent according to claim 1, comprising adding the multitype-adsorptive-group polycarboxylic acid water-reducing agent as a water-reducing agent in portland cement concretes, wherein a solid dosage of the multitype-adsorptive-group polycarboxylic acid water-reducing agent is 0.06 to 0.15% of a mass of a cementitious material.

* * * * *